(12) United States Patent
Oh et al.

(10) Patent No.: US 11,317,001 B2
(45) Date of Patent: Apr. 26, 2022

(54) ANTI-COUNTERFEITING PRINTED MATERIAL AND MANUFACTURING METHOD THEREFOR

(71) Applicant: KOREA MINTING, SECURITY PRINTING ID CARD OPERATING CORP, Daejeon (KR)

(72) Inventors: Chang Jin Oh, Daejeon (KR); Jong Gap Jeong, Daejeon (KR); Gwang Hui Hong, Sejong-si (KR); Hui Seung Son, Sejong-si (KR); Hyeon Jun Kim, Daejeon (KR)

(73) Assignee: KOREA MINTING, SECURITY PRINTING ID CARD OPERATING CORP, Daejeon (KR)

( * ) Notice: Subject to any disclaimer, the term of this patent is extended or adjusted under 35 U.S.C. 154(b) by 0 days.

(21) Appl. No.: 17/265,752

(22) PCT Filed: Sep. 19, 2019

(86) PCT No.: PCT/KR2019/012139
§ 371 (c)(1),
(2) Date: Feb. 3, 2021

(87) PCT Pub. No.: WO2020/085655
PCT Pub. Date: Apr. 30, 2020

(65) Prior Publication Data
US 2021/0168260 A1 Jun. 3, 2021

(30) Foreign Application Priority Data
Oct. 25, 2018 (KR) ........................ 10-2018-0127852

(51) Int. Cl.
*B41M 3/10* (2006.01)
*H04N 1/32* (2006.01)
(Continued)

(52) U.S. Cl.
CPC .......... *H04N 1/32309* (2013.01); *B41M 3/14* (2013.01); *B42D 25/405* (2014.10); *B42D 25/29* (2014.10)

(58) Field of Classification Search
CPC ........... H04N 1/32309; H04N 1/32144; H04N 1/32149; B41M 3/10; B42D 25/29
(Continued)

(56) References Cited

U.S. PATENT DOCUMENTS 5,708,717 A * 1/1998 Alasia ...................... G09C 5/00
380/54
2007/0003294 A1* 1/2007 Yaguchi ............. H04N 1/00883
399/15

FOREIGN PATENT DOCUMENTS

JP 2000-108490 A 4/2000
KR 10-2001-0111242 A 12/2001
(Continued)

OTHER PUBLICATIONS

International Search Report for PCT/KR2019/012139 dated Jan. 3, 2020 from Korean Intellectual Property Office.

*Primary Examiner* — Jamares Q Washington
(74) *Attorney, Agent, or Firm* — Paratus Law Group, PLLC (57) ABSTRACT

Disclosed is an anti-counterfeiting printed material including: a background part for analyzing a distribution of Cyan Magenta Yellow Black (C/M/Y/K) after performing first color separation of an original image into C/M/Y/K, and printing the original image as C/M/Y/K lines each having an included angle preset according to each distribution; and a latent image part formed in a first region of the background part, and printed with the number of C/M/Y/K lines in a ratio different from the number of C/M/Y/K lines of the background part according to each distribution by performing
(Continued)

secondary color separation, into C/M/Y/K, of a second region spaced apart from the first region by a preset distance.

<div align="center">

13 Claims, 5 Drawing Sheets

</div>

(51) Int. Cl.
    *B42D 25/405*         (2014.01)
    *B41M 3/14*           (2006.01)
    *B42D 25/29*          (2014.01)

(58) Field of Classification Search
    USPC .......................................... 358/2.1, 3.06, 3.28
    See application file for complete search history.

(56) References Cited

FOREIGN PATENT DOCUMENTS

| KR | 10-2008-0075893 A | 8/2008 |
| KR | 10-2017-0046240 A | 5/2017 |
| KR | 10-1770984 B1 | 9/2017 |
| KR | 10-2017-0128891 A | 11/2017 |

\* cited by examiner

ANTI-COUNTERFEITING PRINTED MATERIAL AND MANUFACTURING METHOD THEREFOR

CROSS-REFERENCE TO PRIOR APPLICATIONS

This application is a National Stage Patent Application of PCT International Patent Application No. PCT/KR2019/012139 (filed on Sep. 19, 2019) under 35 U.S.C. § 371, which claims priority to Korean Patent Application No. 10-2018-0127852 (filed on Oct. 25, 2018), which are all hereby incorporated by reference in their entirety.

BACKGROUND

The present disclosure relates to a printed material and, more particularly, to an anti-counterfeiting printed material and a manufacturing method therefor.

With the recent development of IT technology, crimes committed by easily copying and using banknotes, checks, various certificates, and security documents are increasing due to the improvement of resolution and reproduction capabilities of computer-related devices, such as scanners, printers, and multifunction devices, and related software.

In order to solve such a problem, many anti-counterfeiting technologies in copying have been researched, and like Korean Patent Application Publication No. 10-2001-0111242, most of the technologies are printing technologies for anti-counterfeiting in copying, wherein when printed materials such as banknotes, securities, identification, cards, various certificates for security purposes are copied with a color or black-and-white copier or scanned with a scanner, the printed materials may be identified as counterfeit by making a latent image appear through a pattern printed on the printed materials.

However, for the printed materials to which such technologies are applied, a counterfeiter generating printed materials may identify an appearing position of the latent image and perform additional manipulation to prevent the latent image from appearing, thereby generating counterfeit printed materials that are difficult to be verified as authentic by using copying, etc. In other words, by exploiting the fact that a latent image appears in a forged copy, the counterfeiter generates the forged copy without the latent image. Accordingly, from the above point of view, the conventional printing technologies for anti-counterfeiting in copying, causing the latent image to appear, have a weak side in preventing counterfeiting.

In addition, in the related art, a latent image is printed by adding a spot color ink together with Cyan Magenta Yellow Black (CMYK) ink in order to print the latent image. Accordingly, there is a problem in that printing cost increases and an additional process occurs.

SUMMARY

An objective of the present disclosure is to provide an anti-counterfeiting printed material wherein it is difficult to identify a latent image part having a security pattern with the naked eye and on which a print pattern for the latent image part which is not identified even through copying or scanning is printed.

In addition, another objective of the present disclosure is to provide an anti-counterfeiting printed material that may be checked for counterfeit, not through copying or scanning, but through an application (app) for smart devices, the application identifying a print pattern printed to prevent counterfeit on an original print, deriving a latent image part having a security pattern from the identified print pattern, and displaying an image of the derived latent image part on a screen.

In addition, yet another objective of the present disclosure is to provide an anti-counterfeiting printed material using only Cyan Magenta Yellow Black (CMYK) ink.

According to a preferred exemplary embodiment of the present disclosure for achieving the above objectives, an anti-counterfeiting printed material and a manufacturing method therefor includes: a background part for analyzing a distribution of Cyan/Magenta/Yellow/Black (C/M/Y/K) after performing first color separation of an original image into C/M/Y/K, and printing the original image as C/M/Y/K lines each having an included angle preset according to each distribution; and a latent image part formed in a first region of the background part, and printed with the number of C/M/Y/K lines in a ratio different from the number of C/M/Y/K lines of the background part according to each distribution by performing secondary color separation, into C/M/Y/K, of a second region spaced apart from the first region by a preset distance.

In addition, each included angle between the C/M/Y/K lines may be based on each distribution of C/M/Y/K obtained by the first color separation, an included angle for two colors each having a lowest distribution may be arranged to be set at 105 degrees, and an included angle for the remaining colors may be arranged to be set at 25 degrees.

In addition, a ratio of the number of C/M/Y/K lines of the background part and the latent image part may be set at 2:1.6 to 1.8 based on the number of lines of a color selected by a sum of distributions greater than or equal to a preset value among each distribution of C/M/Y/K obtained by the secondary color separation in the second region, and may be set at 1:1 based on the number of lines of the remaining colors.

In addition, the sum of the distributions preset to determine the ratio of the number of C/M/Y/K lines of the background part and the latent image part may be 70% or more. In addition, the number of colors whose sum of distributions may be greater than or equal to the preset value among each distribution of C/M/Y/K obtained by the secondary color separation in the second region is at least one or more. In addition, a line thickness of a latent image may be printed by adding a preset value.

In addition, the preset value added to the line thickness of the latent image part may be determined by an equation of $$a = \left(b + \frac{b}{c}\right) - c,$$

where a is the preset value, b is a ratio of the number of lines of the background part, and c is a ratio of the number of lines of the latent image part (200).

In addition, a manufacturing method for an anti-counterfeiting printed material, the manufacturing method includes: performing first color separation of an original image into C/M/Y/K; analyzing each distribution of C/M/Y/K obtained by the first color separation; forming a background part with C/M/Y/K lines each having an included angle preset according to each distribution of C/M/Y/K obtained by the first color separation; selecting a first region, on which a latent image part is printed, in the background part; performing secondary color separation, into C/M/Y/K, of the second region spaced apart from the first region by a preset distance;

analyzing each distribution of C/M/Y/K obtained by the secondary color separation; selecting a color whose sum of the distributions is greater than or equal to a preset value among the C/M/Y/K obtained by the secondary color separation in the second region; forming the latent image part by forming the color, selected according to the sum of the distributions of C/M/Y/K obtained by the secondary color separation in the second region, into the number of lines in a ratio different from the number of lines of the background part; and printing the background part and the latent image part.

In addition, in the forming of the background part with the C/M/Y/K lines each having the included angle preset according to each distribution of C/M/Y/K obtained by the first color separation, each included angle between the C/M/Y/K lines may be based on each distribution of C/M/Y/K obtained by the first color separation, an included angle for two colors each having a lowest distribution may be arranged to be set at 105 degrees, and an included angle for the remaining colors may be arranged to be set at 25 degrees.

In addition, in the forming of the latent image part by forming the color, selected according to the sum of the distributions of C/M/Y/K obtained by the secondary color separation in the second region, into the number of lines in the ratio different from the number of lines of the background part, a ratio of the number of C/M/Y/K lines of the background part and the latent image part may be set at 2:1.6 to 1.8 based on the number of lines of the color selected by the sum of distributions greater than or equal to a preset value among each distribution of C/M/Y/K obtained by the secondary color separation in the second region, and may be set at 1:1 based on the number of lines of the remaining colors.

In addition, the sum of the distributions preset to determine the ratio of the number of C/M/Y/K lines of the background part and the latent image part may be 70% or more. In addition, the number of colors whose sum of the distributions may be greater than or equal to the preset value among each distribution of C/M/Y/K obtained by the secondary color separation in the second region is at least one or more. In addition, a step of additionally forming a line thickness of the latent image as much as a preset value may be preceded by the printing of the background part and the latent image.

In addition, the preset value added to the line thickness of the latent image part may be determined by an equation of $$a = \left(b + \frac{b}{c}\right) - c,$$

where a is the preset value, b is a ratio of the number of lines of the background part, and c is a ratio of the number of lines of the latent image part (200).

As described above, the exemplary embodiment of the present disclosure may have an effect in that a work process is shortened by printing that uses only CMYK ink, thereby reducing the time required for producing a printed material, and reducing the cost required for producing the printed material.

In addition, the exemplary embodiment of the present disclosure may have an effect in that among color-separated C/M/Y/K, two or three colors having a sum of distributions greater than or equal to a preset value are printed at a ratio of 2:1.6 to 1.8, and the remaining colors are printed at a ratio of 1:1, whereby the concealment power of a latent image may be increased, the latent image is prevented from appearing when copying or scanning, and counterfeiting may be checked only through an application (app) for smart devices.

DETAILED DESCRIPTION

Since present disclosure can make various changes and have various embodiments, specific exemplary embodiments will be illustrated in the drawings and described in detail in the specification. However, this is not intended to limit the present disclosure to a particular disclosed form. On the contrary, the present disclosure is to be understood to include all various alternatives, equivalents, and substitutes that may be included within the idea and technical scope of the present disclosure.

While describing each drawing, similar reference numerals have been used for similar components. In the following description of the present disclosure, detailed descriptions of known functions and components incorporated herein will be omitted when it may make the subject matter of the present disclosure unclear.

It will be understood that, although the terms "first", "second", etc. may be used herein to describe various components, these components should not be limited by these terms. These terms are only used for the purpose of distinguishing one element from another element.

For example, without departing from the scope of the present disclosure, a first element may be referred to as a second element, and similarly, a second element may be referred to as a first element.

The term and/or includes a combination of a plurality of related stated items or any of the plurality of related stated items.

The terms used in the present application are only used to describe specific exemplary embodiments, and are not intended to limit the exemplary embodiment of present disclosure.

As used herein, the singular forms are intended to include the plural forms as well, unless the context clearly indicates otherwise. In addition, it will be further understood that the terms "comprise", "include", "have", etc. when used in the present application, specify the presence of stated features, integers, steps, operations, elements, components, and/or combinations of them but do not preclude the possibility of the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the exemplary embodiment of present disclosure belongs.

It will be further understood that terms as defined in dictionaries commonly used herein should be interpreted as having a meaning that is consistent with their meaning in the context of this specification and the relevant art and will not be interpreted in an idealized or overly formal sense unless expressly so defined herein.

Hereinafter, an anti-counterfeiting printed material according to an exemplary embodiment of the present disclosure will be described in detail with reference to the drawings. Hereinafter, descriptions of conventionally known matters are omitted or simplified to clarify the gist of the present disclosure.

Figure 1:
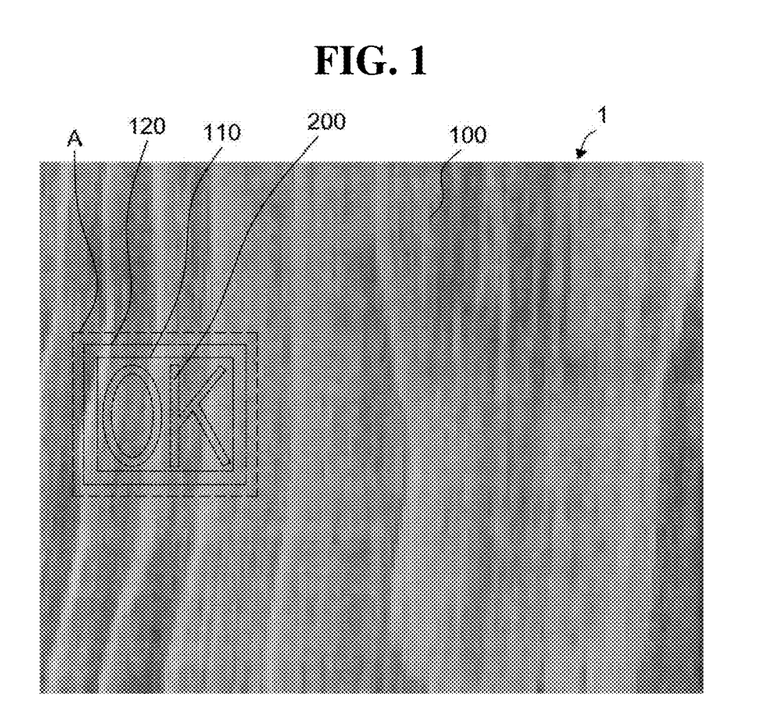
FIG. 1 is a view showing an anti-counterfeiting printed material according to an exemplary embodiment of the present disclosure.
Figure 2:
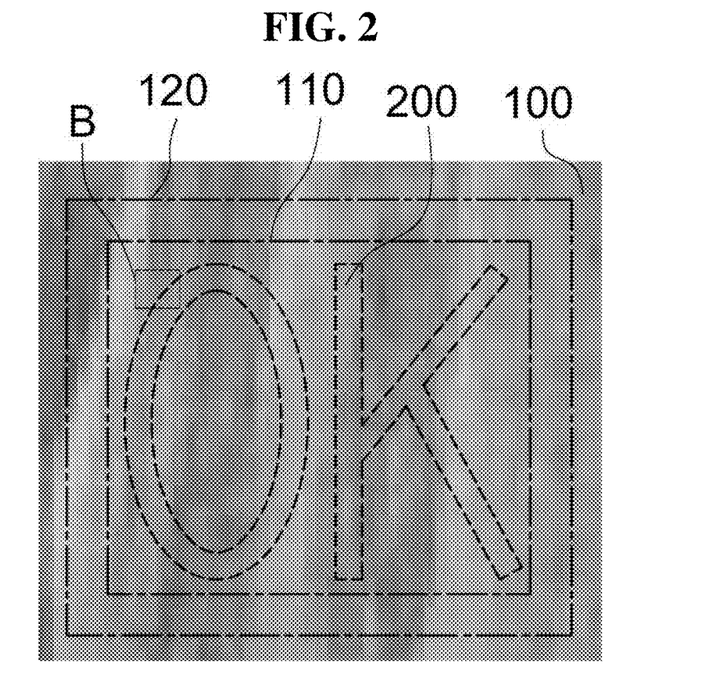
FIG. 2 is a view showing an enlarged image of A in FIG. 1.
Figure 3:
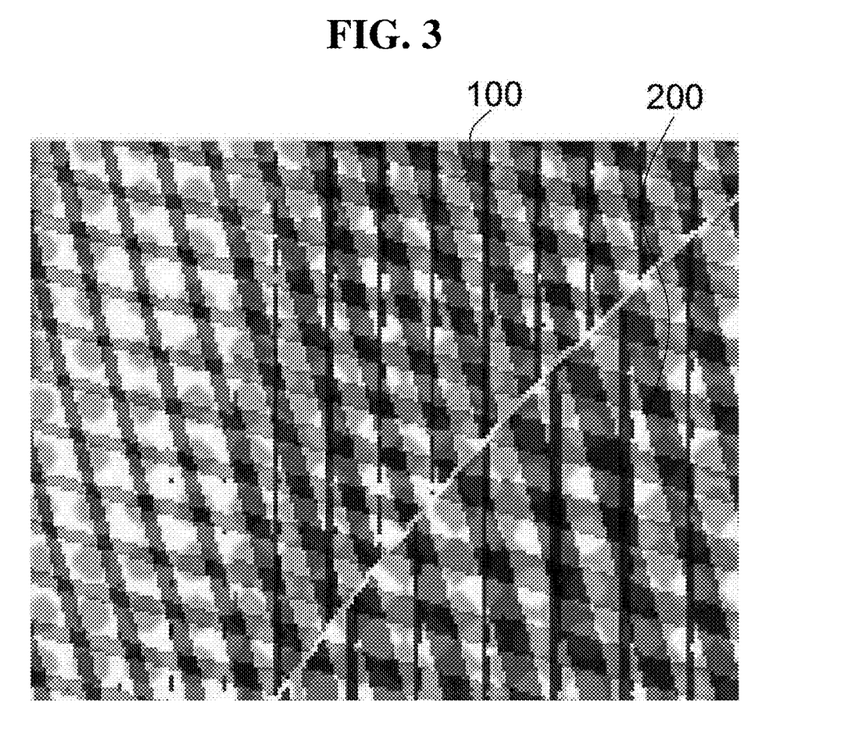
FIG. 3 is a view showing an enlarged image B of FIG. 2.
Figure 4A:
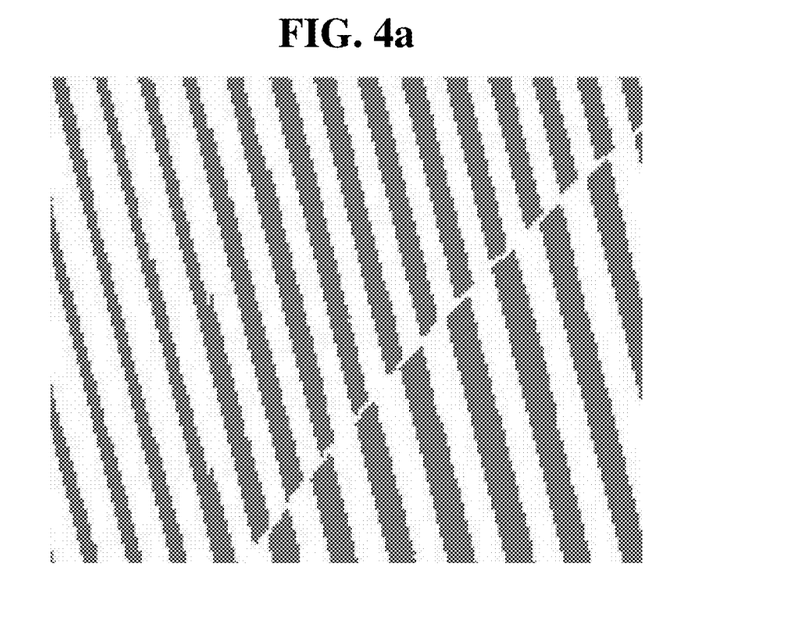
FIG. 4a is a view showing an image for a position of C among C/M/Y/K in which the image in FIG. 3 is color-separated.
Figure 4B:
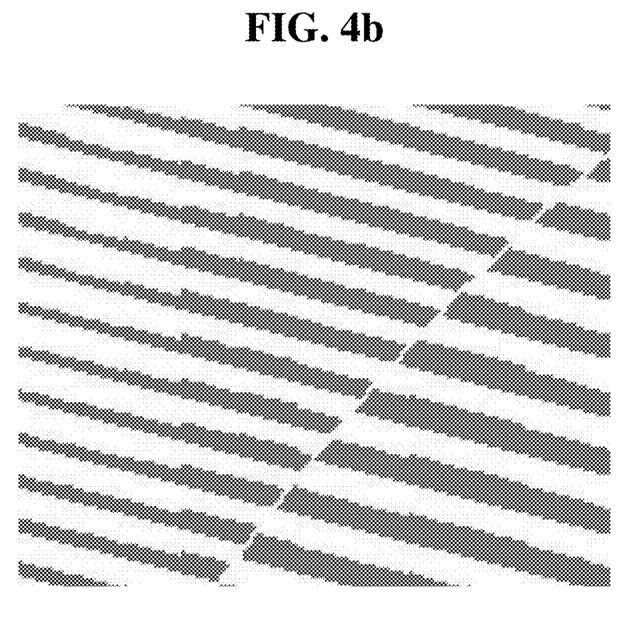
FIG. 4b is a view showing an image for a position of M among C/M/Y/K in which the image in FIG. 3 is color-separated.
Figure 4C:
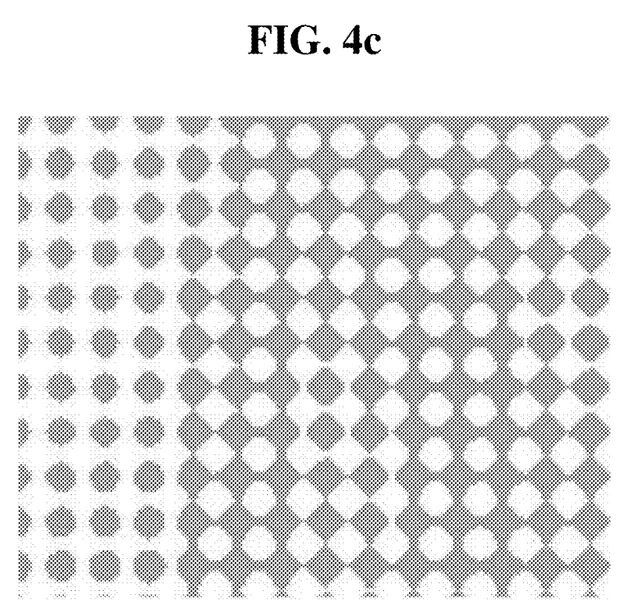
FIG. 4c is a view showing an image for a position of Y among C/M/Y/K in which the image in FIG. 3 is color-separated.
Figure 4D:
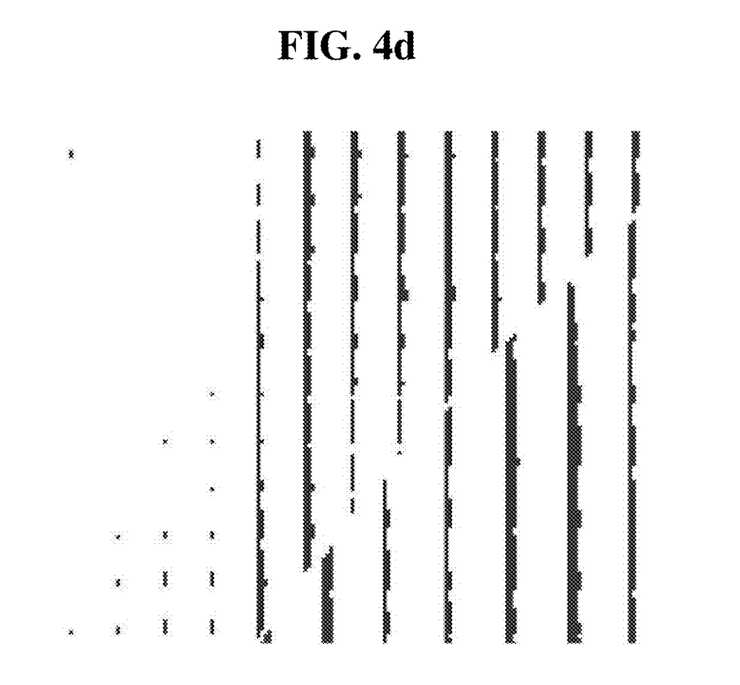
FIG. 4d is a view showing an image for a position of K among C/M/Y/K in which the image in FIG. 3 is color-separated.

FIG. 1 is a view showing an anti-counterfeiting printed material according to an exemplary embodiment of the present disclosure. FIG. 2 is a view showing an enlarged image of A in FIG. 1. FIG. 3 is a view showing an enlarged image B of FIG. 2. FIG. 4a is a view showing an image for a position of C among C/M/Y/K in which the image in FIG. 3 is color-separated. FIG. 4b is a view showing an image for a position of M among C/M/Y/K in which the image in FIG. 3 is color-separated. FIG. 4c is a view showing an image for a position of Y among C/M/Y/K in which the image in FIG. 3 is color-separated. FIG. 4d is a view showing an image for a position of K among C/M/Y/K in which the image in FIG. 3 is color-separated.

Referring to FIGS. 1 to 4, the anti-counterfeiting printed material 1 according to the exemplary embodiment of the present disclosure may reduce the time required for production of a printed material, and save the cost required for production of the printed material. In addition, the concealment power of a latent image may be increased, the latent image is prevented from appearing when copying or scanning, and counterfeiting may be checked only through an application (app) for smart devices. In addition, the concealment power of the latent image seen with the naked eye may be increased by printing the size of a text or image of the latent image as large as a preset value. The anti-counterfeiting printed material 1 may include a background part 100 and a latent image part 200.

The background part 100 may analyze distributions of C/M/Y/K after performing first color separation of an original image into C/M/Y/K, and print the original image as C/M/Y/K lines each having an included angle preset according to each distribution, and may include a first region 110 in which the latent image part 200 is formed. The first region 110 in which the latent image part 200 is formed may be an arbitrary region on the background part 100, and a position of the first region is not limited on the background part 100.

The number of lines of the background part 100 may be 200 per 1 inch (i.e., 25.4 mm), and the line spacing may be a fraction value of 25.4 mm/200=0.127 mm, as 200 lines are printed per 1 inch (i.e., 25.4 mm). The distributions of C/M/Y/K may be obtained by calculating the color, distributed in the original image, in pixel units. The reason why the number of lines of the background part 100 is 200 per 1 inch (i.e., 25.4 mm) is because when the number of lines is less than 200 per 1 inch (i.e., 25.4 mm), there may be a possibility of being distinguished with the naked eye.

In addition, each included angle between the C/M/Y/K lines is based on each distribution of C/M/Y/K obtained by the first color separation, so that an included angle for two colors having the lowest distribution may be arranged to be set at 105 degrees and an included angle for the remaining colors may be arranged to be set at 25 degrees.

In addition, among the color-separated C/M/Y/K, a color having the lowest distribution or one of the two colors having the lowest distribution may be formed in a shape of dots, whereby it is possible to improve the concealment power of the latent image part 200 seen with the naked eye by allowing the color having the lowest distribution or one of the two colors each having the lowest distribution to be formed in the shape of dots.

The latent image part 200 may be formed in the first region 110 of the background part 100, and after performing secondary color separation, into C/M/Y/K, of the second region 120 spaced apart from the first region 110 by a preset distance and then analyzing the distributions of C/M/Y/K, the latent image part 200 may be printed with the number of C/M/Y/K lines in a ratio different from the number of C/M/Y/K lines of the background part 100 according to each distribution.

Determination of the number of lines of the latent image part 200 may be based on the number of C/M/Y/K lines of the background part 100, and different ratios of the background part 100 versus the latent image part 200 may be 2:1.6 to 1.8, preferably 2:1.7. That is, the number of lines of the latent image part 200 may be 160 to 180 lines per 1 inch (i.e., 25.4 mm), preferably 170 lines, and the line spacing may be a fraction value of 25.4 mm/160 to 180 lines=0.141 to 0.15875 mm, that is, 160 to 180 lines are printed per 1 inch (i.e., 25.4 mm).

In addition, a ratio of the number of C/M/Y/K lines of the background part to the number of the C/M/Y/K lines of the latent image part 200 is set at 2:1.6 to 1.8 based on the number of lines of a color selected by a sum of distributions greater than or equal to a preset value among each distribution of C/M/Y/K obtained by the secondary color separation in the second region, and is set at 1:1 based on the number of lines of the remaining colors.

The preset value for selecting a color from the sum of the distributions among each distribution of C/M/Y/K obtained by the second color separation in the second region 120 may be a value of 60 to 80%, and may preferably be greater than or equal to 70%. That is, the latent image part 200 may be formed only with the selected color whose sum of the distributions is greater than or equal to 60 to 80%, and the concealment power of the latent image part 200 may be increased by setting the ratio of the number of lines of the background part 100 and the latent image part 200 for unselected colors at a ratio of 1:1. In addition, the number of colors whose sum of distributions among each distribution of C/M/Y/K obtained by secondary color separation in the second region 120 is 60 to 80% or more may be at least one or more, and may be up to three at most.

Figure 5:
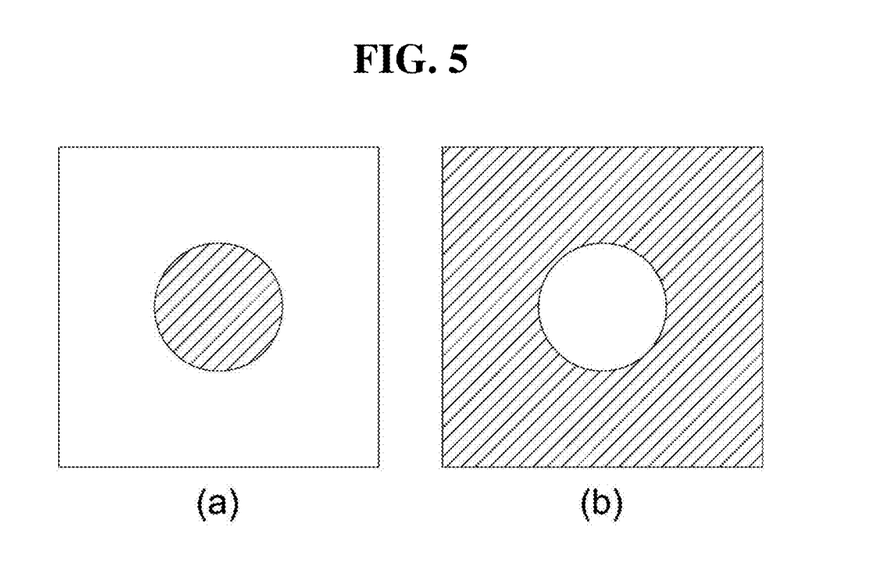
FIGS. 5a and 5b are views showing exemplary views of Ebbinghaus Illusion.

Referring to FIGS. 5a and 5b, which are exemplary diagrams of Ebbinghaus Illusion, in order to prevent the line thickness of the latent image part 200 from being observed smaller than a preset size of the latent image part 200 by the phenomenon of Ebbinghaus Illusion, which makes shapes of the same size appear the shapes having sizes different from each other, the line thickness of the latent image part 200, may be printed by forcibly adding a thickness as much as a preset value, and the formula to obtain the preset value that is forcibly added is as follows.

$$a = \left(b + \frac{b}{c}\right) - c \quad \text{[Equation 1]}$$

In the above equation, a may be a value for forcibly adding a thickness, b may be a ratio of the number of lines of the background part 100, and c may be a ratio of the number of lines of the latent image part 200.

As an example, when the ratio of the background part 100 and the latent image part 200 is 2:1.8, the forcibly added thickness value a=(2+2/1.8)−1.8=1.31 may be obtained. That is, the line of the latent image part 200 may be printed with the thickness added by 0.0131%.

When the ratio of the background part 100 and the latent image part 200 is 2:1.6, the forcibly added thickness value a=(2+2/1.6)−1.6=1.65 may be obtained. That is, the line of the latent image part 200 may be printed with the thickness added by 0.0165%.

Hereinafter, a manufacturing method of an anti-counterfeiting printed material according to the exemplary embodiment of the present disclosure will be described in detail with reference to the drawings. Hereinafter, descriptions of conventionally known matters are omitted or simplified to clarify the gist of the present disclosure.

Figure 6:
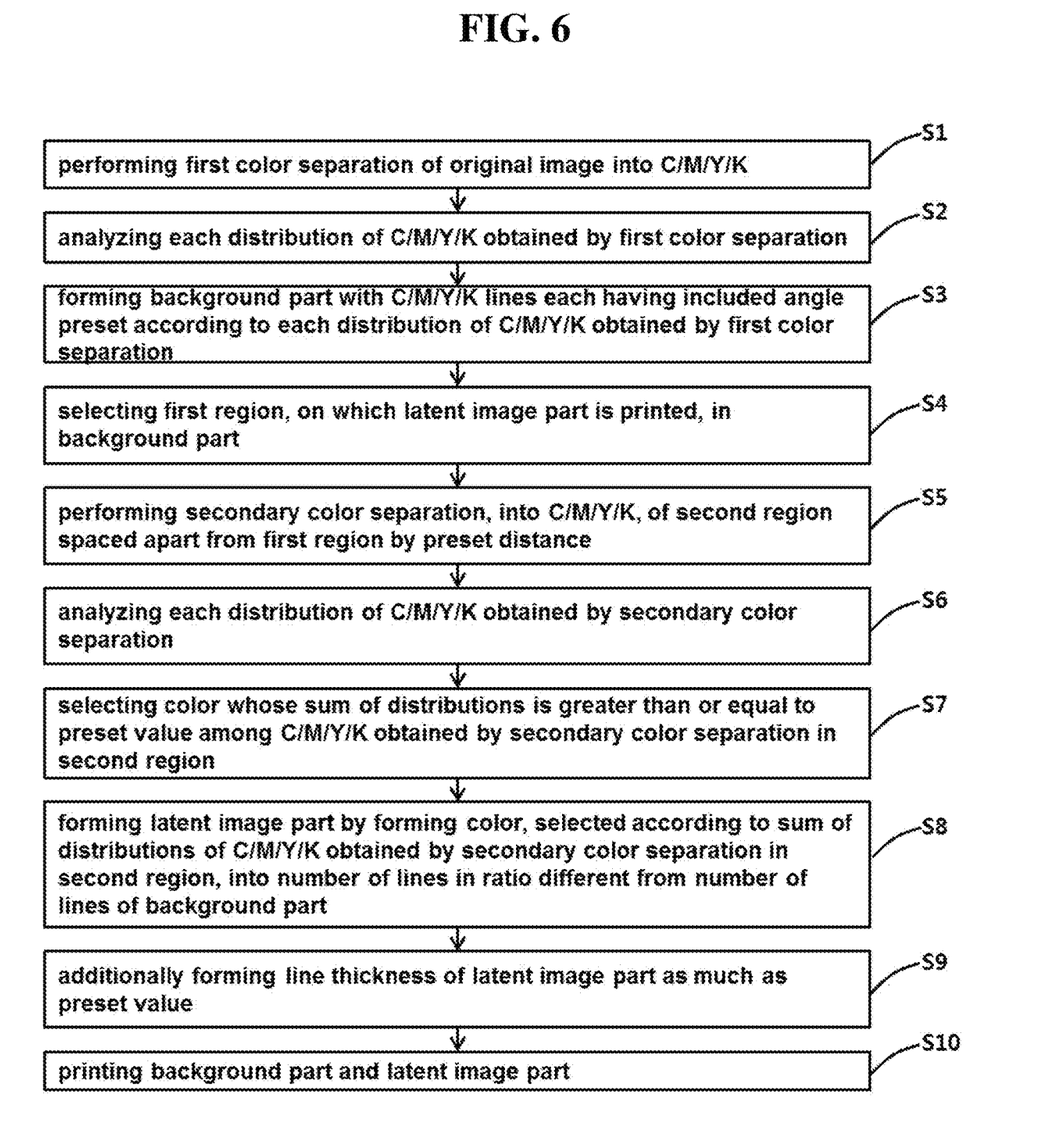
FIG. 6 is a view showing a flowchart of manufacturing an anti-counterfeiting printed material according to the exemplary embodiment of the present disclosure.

FIG. 6 is a view showing a flowchart of manufacturing an anti-counterfeiting printed material according to the exemplary embodiment of the present disclosure.

Referring to FIG. 6, the manufacturing method of the anti-counterfeiting printed material 1 according to the exemplary embodiment of the present disclosure will be described. By the following description, the above-described configuration may become clearer.

In the exemplary embodiment of the present disclosure, the anti-counterfeiting printed material 1 may be manufactured by a method thereof, including: step S1 of performing first color separation of an original image into C/M/Y/K; step S2 of analyzing each distribution of C/M/Y/K obtained by the first color separation; and step S3 of forming a background part 100 with C/M/Y/K lines each having an included angle preset according to each distribution of C/M/Y/K obtained by the first color separation.

Here, in the step S3 of forming the background part 100 with the C/M/Y/K lines each having the included angle preset according to each distribution of C/M/Y/K obtained by the first color separation, each included angle between the C/M/Y/K lines is based on each distribution of C/M/Y/K obtained by the first color separation, so that an included angle for two colors each having the lowest distribution may be arranged to be set at 105 degrees and an included angle for the remaining colors may be arranged to be set at 25 degrees.

Next, the manufacturing method may include: step S4 of selecting a first region 110, on which a latent image part 200 is printed, in a background part 100; and step S5 of performing secondary color separation, into C/M/Y/K, of a second region 120 spaced apart from the first region 110 by a preset distance. Next, the manufacturing method may include: step S6 of analyzing each distribution of C/M/Y/K obtained by the secondary color separation; and step S7 of selecting a color whose sum of the distributions is greater than or equal to a preset value among C/M/Y/K obtained by the secondary color separation in the second region 120.

Next, the manufacturing method may include: step S8 of forming the latent image part 200 by forming the color, selected according to the sum of the distributions of C/M/Y/K obtained by the secondary color separation in the second region, into the number of lines in a ratio different from the number of lines of the background part 100; and step S9 of adding a line thickness of the latent image part 200 as much as a preset value to form the line thickness as thick as the preset value.

Here, in the step S8 of forming of the latent image part 200 by the number of lines having the ratio different from the number of lines of the background part 100 and generated by the color selected according to the sum of the distributions of C/M/Y/K obtained by the secondary color separation in the second region 120, a ratio of the number of C/M/Y/K lines of the background part and the latent image part 200 is set at 2:1.6 to 1.8 based on the number of lines of a color selected by a sum of distributions greater than or equal to a preset value among each distribution of C/M/Y/K obtained by the secondary color separation in the second region, and is set at 1:1 based on the number of lines of the remaining colors.

In addition, the sum of the distributions preset to determine the ratio of the number of C/M/Y/K lines of the background part 100 and the latent image part 200 may be 60 to 80% or more, preferably 70% or more. That is, the latent image part 200 may be formed only with the selected color whose sum of the distributions is greater than or equal to 60 to 80%, and the concealment power of the latent image part 200 may be increased by setting the ratio of the number of lines of the background part 100 and the latent image part 200 for unselected colors as a ratio of 1:1.

In addition, the color whose sum of the distributions of each distribution of C/M/Y/K obtained by the secondary color separation in the second region 120 is 60 to 80%, or more may be at least one or more, and may be up to three at most.

Finally, the manufacturing method may include step of S10 of printing the background part 100 and the latent image part 200 to which the included angle and the ratio of line numbers, which are set on the basis of the distributions, are applied.

The invention claimed is:

1. An anti-counterfeiting printed material comprising:
    a background part for analyzing a distribution of C/M/Y/K after performing first color separation of an original image into C/M/Y/K, and printing the original image as C/M/Y/K lines each having an included angle preset according to each distribution; and
    a latent image part formed in a first region of the background part, and printed with the number of C/M/Y/K lines in a ratio different from the number of C/M/Y/K lines of the background part according to each distribution by performing secondary color separation, into C/M/Y/K, of a second region spaced apart from the first region by a preset distance,
    wherein each included angle between the C/M/Y/K lines is based on each distribution of C/M/Y/K obtained by the first color separation,
    an included angle for two colors each having a lowest distribution is arranged to be set at 105 degrees, and
    an included angle for the remaining colors is arranged to be set at 25 degrees.

2. An anti-counterfeiting printed material comprising:
    a background part for analyzing a distribution of C/M/Y/K after performing first color separation of an original image into C/M/Y/K, and printing the original image as C/M/Y/K lines each having an included angle preset according to each distribution; and a latent image part formed in a first region of the background part, and printed with the number of C/M/Y/K lines in a ratio different from the number of C/M/Y/K lines of the background part according to each distribution by performing secondary color separation, into C/M/Y/K, of a second region spaced apart from the first region by a preset distance, wherein a ratio of the number of C/M/Y/K lines of the background part and the latent image part is set at 2:1.6 to 1.8 based on the number of lines of a color selected by a sum of distributions greater than or equal to a preset value among each distribution of C/M/Y/K obtained by the secondary color separation in the second region, and is set at 1:1 based on the number of lines of the remaining colors.

3. The anti-counterfeiting printed material of claim 2, wherein the sum of the distributions preset to determine the ratio of the number of C/M/Y/K lines of the background part and the latent image part is 70% or more.

4. The anti-counterfeiting printed material of claim 2, wherein the number of colors whose sum of distributions is greater than or equal to the preset value among each distribution of C/M/Y/K obtained by the secondary color separation in the second region is at least one or more.

5. The anti-counterfeiting printed material of claim 1, wherein a line thickness of a latent image is printed by adding a preset value.

6. The anti-counterfeiting printed material of claim 5, wherein the preset value added to the line thickness of the latent image part is determined by an equation of $$a = \left(b + \frac{b}{c}\right) - c,$$

where a is the preset value, b is a ratio of the number of lines of the background part, and c is a ratio of the number of lines of the latent image part (200).

7. A manufacturing method for an anti-counterfeiting printed material, the manufacturing method comprising:

performing first color separation of an original image into C/M/Y/K;

analyzing each distribution of C/M/Y/K obtained by the first color separation;

forming a background part with C/M/Y/K lines each having an included angle preset according to each distribution of C/M/Y/K obtained by the first color separation;

selecting a first region, on which a latent image part is printed, in the background part;

performing secondary color separation, into C/M/Y/K, of the second region spaced apart from the first region by a preset distance;

analyzing each distribution of C/M/Y/K obtained by the secondary color separation;

selecting a color whose sum of the distributions is greater than or equal to a preset value among the C/M/Y/K obtained by the secondary color separation in the second region;

forming the latent image part by forming the color, selected according to the sum of the distributions of C/M/Y/K obtained by the secondary color separation in the second region, into the number of lines in a ratio different from the number of lines of the background part; and printing the background part and the latent image part.

8. The manufacturing method of claim 7, wherein, in the forming of the background part with the C/M/Y/K lines each having the included angle preset according to each distribution of C/M/Y/K obtained by the first color separation, each included angle between the C/M/Y/K lines is based on each distribution of C/M/Y/K obtained by the first color separation, an included angle for two colors each having a lowest distribution is arranged to be set at 105 degrees, and an included angle for the remaining colors is arranged to be set at 25 degrees.

9. The manufacturing method of claim 7, wherein, in the forming of the latent image part by forming the color, selected according to the sum of the distributions of C/M/Y/K obtained by the secondary color separation in the second region, into the number of lines in the ratio different from the number of lines of the background part, a ratio of the number of C/M/Y/K lines of the background part and the latent image part is set at 2:1.6 to 1.8 based on the number of lines of the color selected by the sum of distributions greater than or equal to a preset value among each distribution of C/M/Y/K obtained by the secondary color separation in the second region, and is set at 1:1 based on the number of lines of the remaining colors.

10. The manufacturing method of claim 9, wherein the sum of the distributions preset to determine the ratio of the number of C/M/Y/K lines of the background part and the latent image part is 70% or more.

11. The manufacturing method of claim 9, wherein the number of colors whose sum of the distributions is greater than or equal to the preset value among each distribution of C/M/Y/K obtained by the secondary color separation in the second region is at least one or more.

12. The manufacturing method of claim 7, wherein a step of additionally forming a line thickness of the latent image as much as a preset value is preceded by the printing of the background part and the latent image.

13. The manufacturing method of claim 12, wherein the preset value added to the line thickness of the latent image part is determined by an equation of $$a = \left(b + \frac{b}{c}\right) - c,$$

where a is the preset value, b is a ratio of the number of lines of the background part, and c is a ratio of the number of lines of the latent image part.

\* \* \* \* \*